A. W. FARRELL.
DIFFERENTIAL MECHANISM OR EQUALIZING GEARING FOR MOTOR DRIVEN VEHICLES.
APPLICATION FILED JULY 8, 1912.

1,240,551.

Patented Sept. 18, 1917.
2 SHEETS—SHEET 1.

Witnesses
C. U. Nemich
E. Newstrom.

Inventor
Archie W. Farrell
by Chas. C. Tideman
Atty

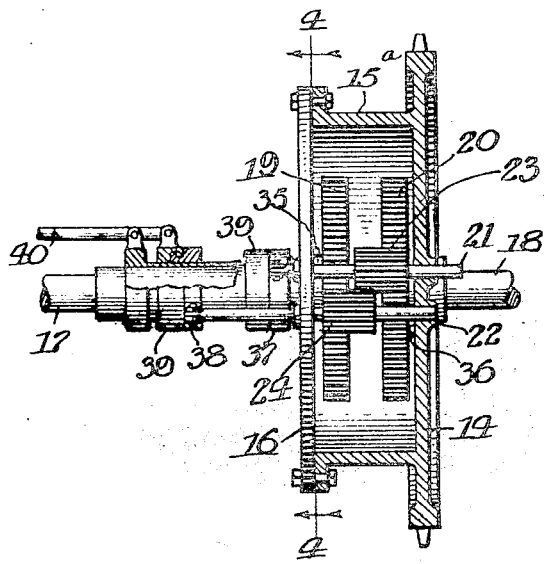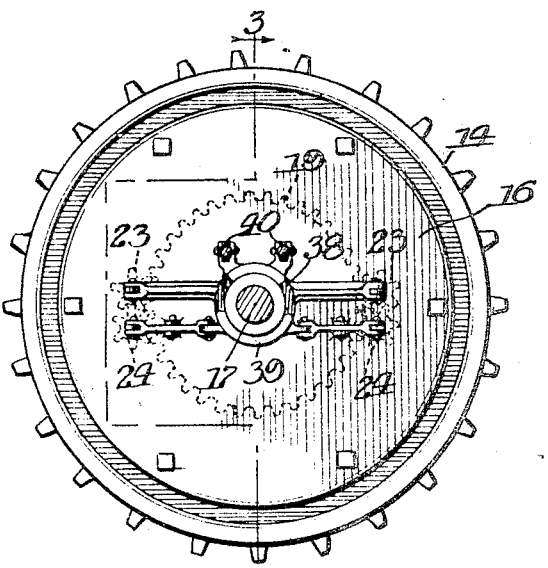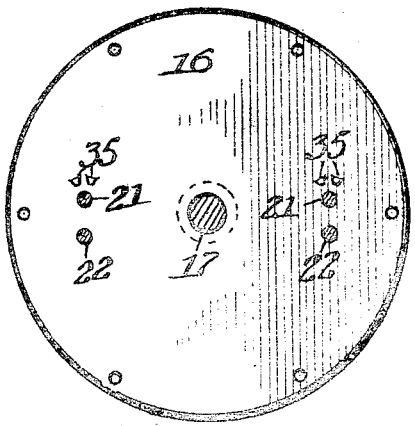

UNITED STATES PATENT OFFICE.

ARCHIE W. FARRELL, OF MAPLE PARK, ILLINOIS.

DIFFERENTIAL MECHANISM OR EQUALIZING-GEARING FOR MOTOR-DRIVEN VEHICLES.

1,240,551.  Specification of Letters Patent.  Patented Sept. 18, 1917.

Application filed July 8, 1912. Serial No. 708,137.

*To all whom it may concern:*

Be it known that I, ARCHIE W. FARRELL, a citizen of the United States, residing at Maple Park, in the county of Kane and State of Illinois, have invented certain new and useful Improvements in a Differential Mechanism or Equalizing-Gearing for Motor-Driven Vehicles, of which the following is a specification.

The present invention relates to a differential mechanism or equalizing gearing having locking features whereby the driven shafts may be locked relative to the driving element.

The principal object of the invention is to provide a mechanism or gearing of the above described character, which may be used in any suitable location or in connection with any kind of machinery where such mechanisms or gearings are usually employed, which shall be simple and inexpensive in construction, strong, durable and efficient in operation.

Other objects and their resultant advantages will become apparent as the nature of the invention is better understood from the following description and accompanying drawings, in which latter—

Fig. 2, is a side elevation of the equalizing gearing with parts broken away.

Fig. 3, is a vertical sectional view taken on line 3—3, of Fig. 2, looking in the direction indicated by the arrows, and Fig. 4, is a section taken on line 4—4, of Fig. 3.

Figure 1:
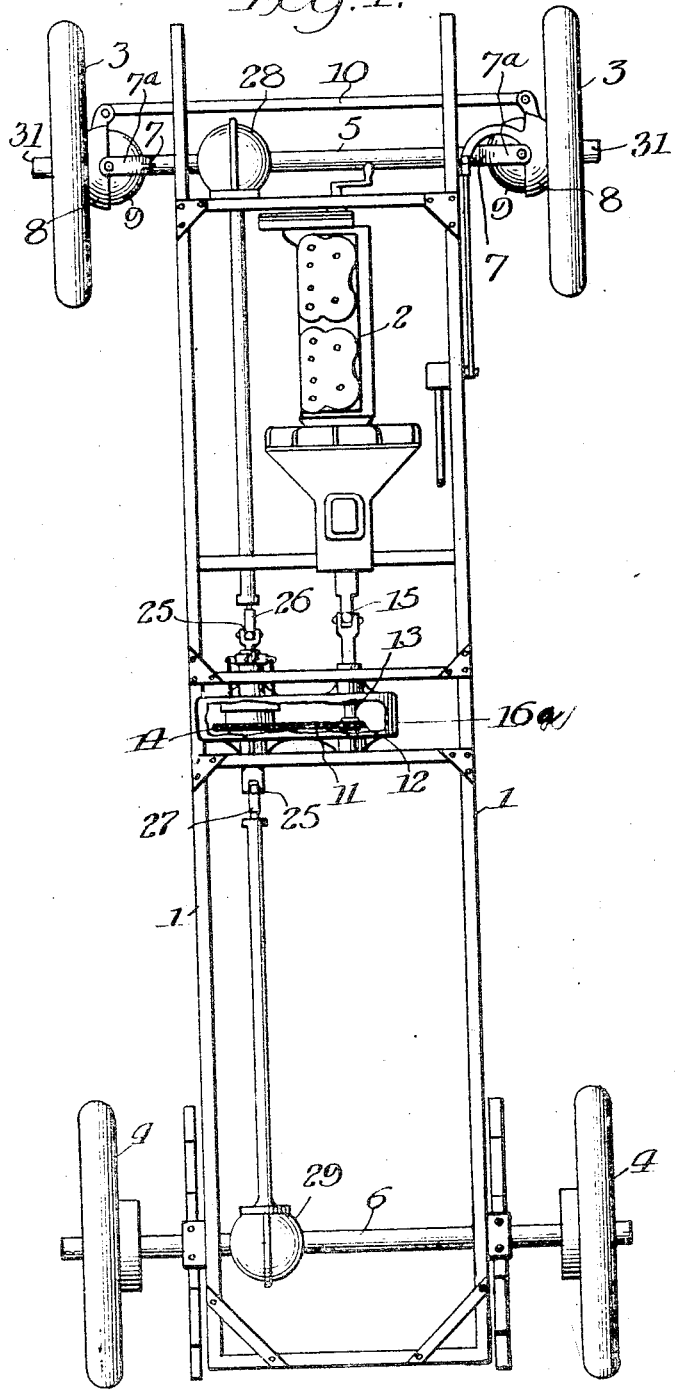
Figure 1, is a plan view of an ordinary automobile chassis showing the preferred location of the various parts of my invention.

Referring specifically to the drawings, 1, indicates a suitable frame work of an automobile chassis; 2 indicates a gasolene motor, which may be of any of the usual types used for motor vehicles: 3 and 4, indicate the front and rear traction wheels respectively, and 5 and 6, their respective hollow axles.

In order to permit the front wheels 3, to be used for both steering and driving purposes at the same time, I securely mount on each end of the front axle 5, a casting 7, having fork-shaped extensions 7ª, the ends of which span and are vertically pivoted to the wheel supporting members 8. The members 8, are formed in the shape of a cup having a tubular extension 9, and which forms a journal or bearing for the driving spindle of the wheel 3.

It will thus be seen that the castings 7, and members 8, form what are commonly called steering-knuckles, and by connecting one of the steering members 8, to the usual steering mechanism, and by connecting the members 8, as by means of a rod 10, the front wheels 3, may be turned either to the right or left in unison, to direct the course of the vehicle.

As shown in Fig. 1, power from the engine 2, is imparted to the equalizing gearing by means of an endless chain 11, passing over a small sprocket wheel 12, fixed to its shaft 13, and a larger sprocket wheel 14, the shaft 13, being connected to the main power shaft of the engine by means of a flexible coupling 15. The sprockets 12, and 14, and chain 11, are all inclosed in a suitable casing 16ª, carried by the frame 1. As most clearly shown in Fig. 3, the sprocket 14, is provided with a circular flange 15ª, extending outwardly from one side thereof and is adapted to have securely bolted thereto a circular plate or cover 16, which with the flange 15ª, and web of the sprocket 14, forms a housing in which is located the spur gears which comprise my preferred form of equalizing gearing. Passing centrally and loosely through the plate 16, and web of the sprocket 14, are shafts 17, and 18, respectively, the ends of which extend a short distance within the housing before referred to, and have rigidly keyed thereto spur gears 19, and 20, respectively. Passing horizontally through the plate 16, and sprocket 14, and slidably mounted thereon are shafts 21, and 22, arranged in pairs at diametrically opposite points as shown most clearly in Fig. 4. Rotatably mounted on the shafts 21, and 22, but fixed against longitudinal movement thereon are pinions 23, and 24, respectively, which are adapted to mesh with each other and gears 19, and 20. When in normal positions, as shown in Fig. 3, the pinions 23, and 24, will be in mesh with each other with the teeth on the pinion 23, in engagement with the teeth of the gear 20, and the teeth of the pinion 24, in engagement with the teeth of the gear 19, and when in this position the power imparted to the sprocket 14, will be equally distributed to both of the gears 19, and 20, and to their respective shafts 17, and 18. These shafts 17 and 18, are connected by means of flexible couplings 25, to shafts 26, and 27, respectively, the shaft 26, leading to a differential gearing of any desired construction, located in the housing 28, on the front axle 5, of the vehicle, and the shaft 27, leading to a similar differential gearing in the housing 29, on the rear axle 6. Motion from the differential gearing on the rear shaft 6, is transmitted to the rear wheels 4, in the usual manner, as by means of shafting running through the hollow axle 6, and securely fixed to the rear wheels 4, thus turning the same. The means I employ for driving the front wheels comprise shafting, connected to the differential carried by the front axle 5, and running through said axle and being connected to the driving spindles 31, by means of universal joints, located in the housing formed by the steering-knuckles.

The means I employ to lock the equalizing gearing for the purpose of transmitting the power imparted to the sprocket 14, from the motor, to either the gear 19, or 20 independently of each other and consequently to either the front or rear traction wheels, comprise lugs or projections 35, and 36, formed on the inner faces of the plate 16, and web of the sprocket 14, respectively. These projections are of such shape and are so located that they will fit between several of the teeth on the pinions 23, and 24, when the same are slid into engagement therewith, and will thus serve to securely lock the pinions against rotation on their shafts, and thereby hold the same in fixed engagement with either the gear 19, or gear 20, say, for instance, the pinions 24, are in locked engagement with the gear 20. In this event, rotation of the sprocket 14, and with its plate 16, will carry the pinions around with them, and the pinions in turn will cause the gear 20, to rotate in the same direction and at the same speed as the sprocket 14, while the gear 19, will remain idle. To provide for the easy shifting of the pinions 23, and 24, into and out of engagement with their respective locking projections 35, and 36, I slidably mount on the shaft 17, adjacent the plate 16, collars 37, and 38, respectively, which are also free to turn on said shaft 17. Connected to the collars 37, and 38, in any suitable manner are the ends of the pinion shafts 21, and 22, respectively. Also connected to each of the collars and arranged so as not to rotate therewith are sleeves 39, to each of which in turn is connected one end of an operating rod 40, the other end of which is adapted to be connected to a suitable lever or foot-pedal (not shown) located in some point in easy reach of the driver.

Briefly stated the operation of my invention is as follows:

Power from the engine 2, is imparted to the sprocket 14, through the endless sprocket chain 11, and small sprocket 12, and through said sprocket 14, power is transmitted to the gears 19, and 20, through the pinions 23, and 24, which in turn impart motion to the differential gearings carried by the front and rear axles 5, and 6, respectively, and from whence it is carried to the front and rear traction wheels, by means of the shafting heretofore referred to. Assuming that the load created by friction between the traction wheels and the road, on the gears 19 and 20, is equal, and that the pinions 23, and 24, are in the positions shown in Fig. 3, that is, in mesh with each other, and pinion 23, in mesh with gear 20, and pinion 24, in mesh with gear 19, said pinions will be held against rotation on their respective shafts 21, and 22, and will be carried around in a circle by the rotation of the sprocket 14, and thereby cause said gears 19, and 20, to be rotated at equal speed and in the same direction. Obviously, this is only true so long as the loads on gears 19, and 20, are equal and counterbalance each other, but just as soon as the load on one of the gears overcome the load on the other, which may be caused by turning a corner or by the traction wheels passing over certain conditions of the road, the gear having the heavier load will cease to rotate while the gear having the lighter load will continue to rotate say, for instance, the gear 20, has the heavier load, and the gear 19, the lighter load. In this case the pinions 23, in mesh with the gear 20, will be unable to rotate the same and it will remain idle, the pinions being carried around the periphery by the rotation of the sprocket 14, and rotating on their shafts 17. This will cause the pinions 24, to rotate on their shafts 22, and in turn rotate the gear 19. This action will continue until the load on the gears 19, and 20, again become equal, when the pinions 23, and 24, will be held from rotation on their shafts and both the gear 19, and gear 20, will be rotated in the same direction.

Should the driver wish at any time to throw either the front or rear driving mechanism out of operation, it is simply necessary to shift the proper one of the collars 37, or 38, to throw the pinions operated thereby into engagement with their locking projections as heretofore described.

From the foregoing it will be seen that I provide a novel arrangement of gearing for transmitting power to the front or rear wheels of a motor driven vehicle either collectively or separately, some of the more salient advantages over the ordinary mode of driving vehicles by means of the rear wheels only, is that I secure more traction force from the same amount of motive power, and that should either the front or rear drive become damaged it may be readily thrown out of use without affecting the operation of the other. Another advantage is that more easy and steady riding is produced and that skidding is practically eliminated.

While the construction and arrangement of the several parts of my invention as shown in the drawings, have been found to effectively serve the purposes for which they are intended, it will be readily understood that various changes and modifications may be made therein without departing from the spirit of my invention, and I therefore, do not wish to be limited to the particular construction shown.

Having thus fully described my invention what I claim as new and desire to secure by Letters-Patent is—

1. A motor vehicle having power transmission means, a sprocket-gear forming a part of said transmission means, a housing formed on said sprocket wheel and rotating therewith, equalizing gearing arranged within said housing and receiving power by the rotation of said housing, a pair of main gears forming a part of said equalizing gearing, separate shafting connected to each of said main gears, a pair of pinions intermeshing with one another and with said main gears and forming a part of said equalizing gearing, said pinions being shiftably mounted in the housing, and locking projections carried by the inner faces of said housing for engagement with said pinions whereby either or both of said main gears may be held in locking relation with said housing.

2. In a motor driven vehicle, the combination with a pair of alined shafts, of a sprocket-gear mounted on one of said shafts and having a housing mounted on and overhanging the adjacent end of the other of said shafts, means to drive said gear, a main gear mounted on each of said shafts within said housing, a plurality of shafts slidably mounted on the sprocket-gear and said housing in parallelism with the alined shafts and arranged in pairs at diametrically opposite points, a pinion rotatably mounted on each of the last named shafts but movable longitudinally therewith, projections on the inner faces of the housing and sprocket-gear to engage said pinions, and means to move the pinion-shafts so as to cause the pinions thereon to engage or disengage said projections.

3. In a motor driven vehicle, the combination with a pair of alined shafts, of a sprocket-gear mounted on one of said shafts and having a housing mounted on and overhanging the adjacent end of the other of said shafts, means to drive said gear, a main gear mounted on each of said shafts within said housing, a plurality of shafts slidably mounted on the sprocket-gear and said housing in parallelism with the alined shafts and arranged in pairs at diametrically opposite points, a pinion rotatably mounted on each of the last named shafts but movable longitudinally therewith, projections on the inner faces of the housing and sprocket-gear to engage said pinions, and means to independently move each pair of the pinion-shafts so as to cause the pinions thereon to engage or disengage said projections.

4. In a motor driven vehicle, the combination with a pair of alined shafts, of a sprocket-gear mounted on one of said shafts and having a housing mounted on and overhanging the adjacent end of the other of said shafts, means to drive said gear, a main gear mounted on each of said shafts within said housing, a plurality of shafts slidably mounted on the sprocket-gear and said housing in parallelism with the alined shafts and arranged in pairs at diametrically opposite points, a pinion rotatably mounted on each of the last named shafts but movable longitudinally therewith, projections on the inner faces of the housing and sprocket-gear to engage said pinions, collars slidably and rotatably mounted on one of the alined shafts and connected one to each pair of the pinion-shafts, sleeves slidably mounted on said alined shaft and loosely connected one to each of said collars, and means to shift said sleeves and collars back and forth.

ARCHIE W. FARRELL.

Witnesses:
  Chas. C. Tillman,
  E. Newstrom.